Feb. 7, 1961  J. L. SHORT  2,970,861
LIVESTOCK CARRIER
Filed Sept. 8, 1959  2 Sheets-Sheet 1
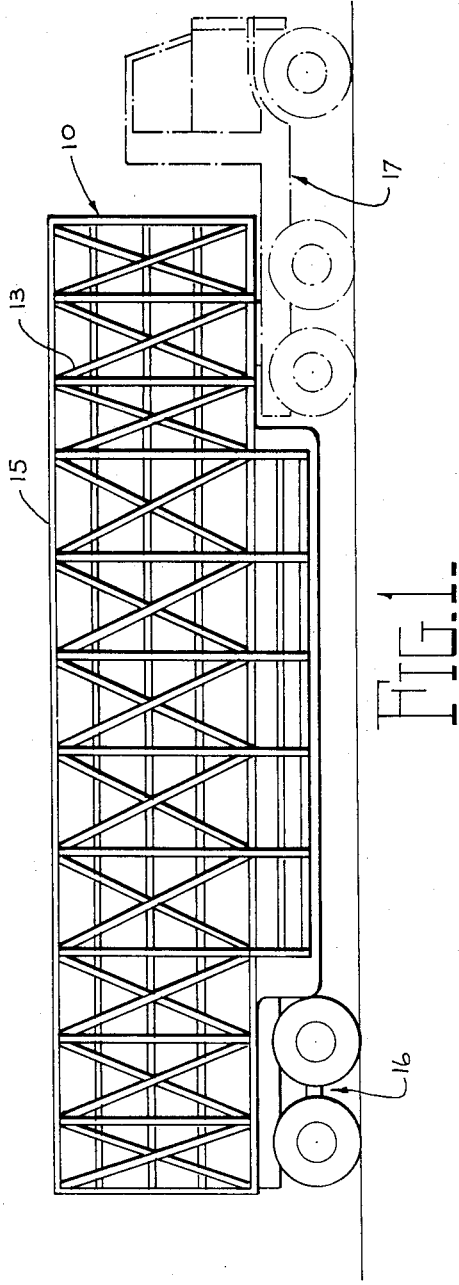
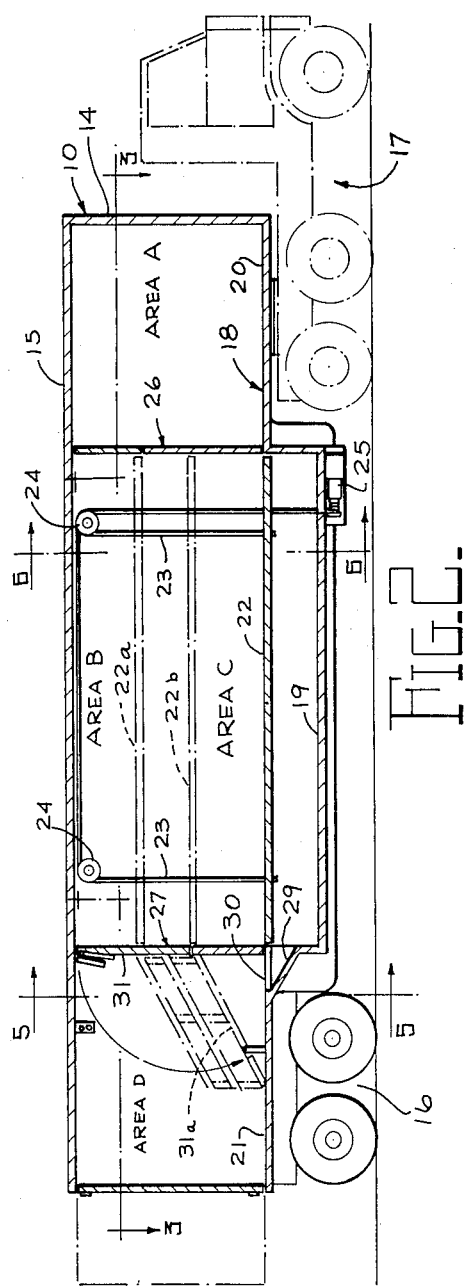
INVENTOR.
JESSE L. SHORT
BY
Owen & Owen
ATTORNEYS

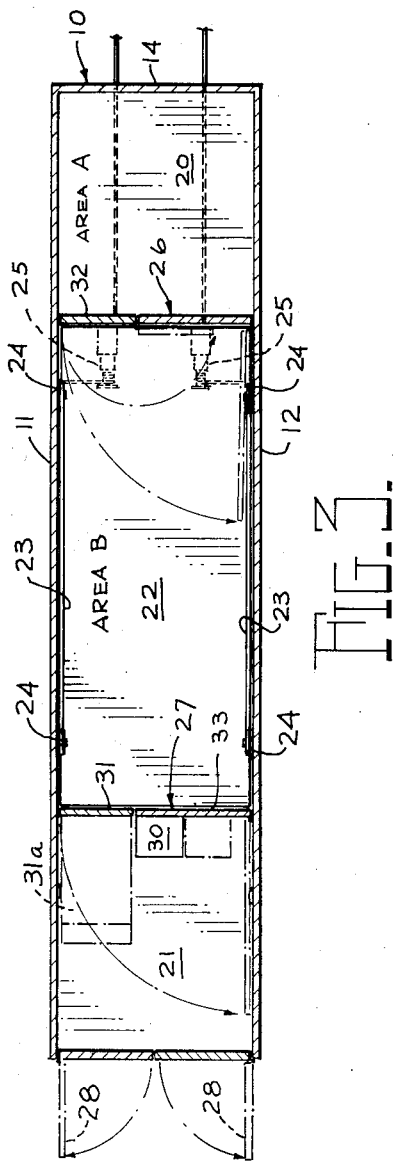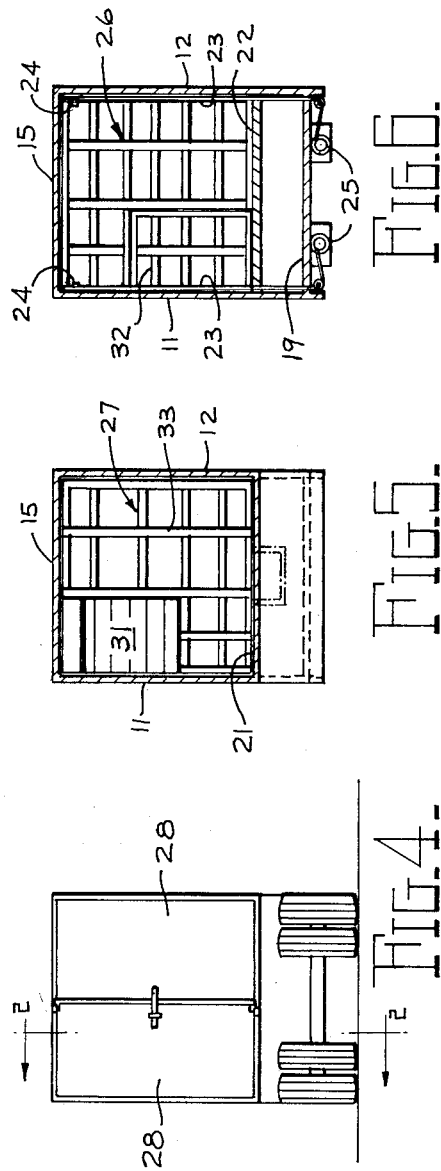

United States Patent Office 2,970,861
Patented Feb. 7, 1961

2,970,861

LIVESTOCK CARRIER

Jesse L. Short, Archbold, Ohio, assignor to Mid-America Highway Express, Inc., a corporation of Ohio Filed Sept. 8, 1959, Ser. No. 838,570

6 Claims. (Cl. 296—24)

This invention relates to a livestock carrier peculiarly adapted for carrying larger numbers of large livestock such as cattle. While the invention is adapted for use on either automotive vehicles or railroad cattle cars, it will be illustrated in this application as embodied in a highway trailer vehicle of the type pulled by a separable tractor.

It has been suggested in the art that double deck livestock carriers may be employed for small animals such as hogs and sheep, and in some instances livestock carriers which can be converted from double deck carriers for small stock to single level carriers for cattle have also been suggested.

The instant invention provides a livestock carrier in which a major portion, at least, of the body is a double deck structure for large animals and is so organized as to permit single level occupancy by large animals in those portions of the carrier which cannot have sufficient height to accommodate two levels of large animals. In either a highway trailer or a railroad car, the vertical height of the trailer or car is limited by statute and by the clearance beneath obstacles such as bridges and underpasses. With such a height limitation, the greatest depth of the vehicle must necessarily be between its supporting wheels, and in a carrier according to the invention the space between the support wheels is utilized to provide for double deck cartage of large animals.

It is, therefore, the principal object of this invention to provide a wheeled livestock carrier wherein all of the vertical height of the carrier is utilized to its utmost capacity for the transportation of large animals such as cattle.

It is yet another object of the instant invention to provide a wheeled livestock carrier comprising a movable deck portion which can be utilized as a bridging structure for the passage of cattle to the most inaccessible portion of the carrier body, can be moved out of the way to allow cattle to enter a lower portion of the carrier, and can be placed above the lower portion of the carrier to function as a second deck for the transportation of cattle thereon.

These and other more specific objects and advantages of a livestock carrier embodying the invention will be better understood from the following specification and from the drawings, in which:

Fig. 1 is a view in side elevation of a wheeled livestock carrier embodying the invention as a highway trailer;

Fig. 2 is a longitudinal vertical sectional view through the trailer shown in Fig. 1;

Fig. 3 is a horizontal sectional view taken along the line 3—3 of Fig. 2;

Fig. 4 is a rear view taken from the left side of Fig. 1;

Fig. 5 is a transverse vertical sectional view taken along the line 5—5 of Fig. 2, and Fig. 6 is a view similar to Fig. 4, but taken along the line 6—6 of Fig. 2.

A wheeled livestock carrier embodying the invention comprises an elongated, generally rectilinear body, generally indicated at 10. The body 10 has two vertical side walls 11 and 12 which are parallel to each other and which are at the sides of the body 10. In the illustrated embodiment, the side walls 11 and 12 are shown as formed of crisscross beams 13 with openwork therebetween to provide for adequate ventilation throughout the body 10. The two side walls 11 and 12 are suitably braced with respect to each other by cross beams (not shown) and are connected by a solid front wall 14. The body may also have a solid roof 15 extending across between the side walls 11 and 12. The body 10 is supported upon suitable support wheel structures, generally indicated at 16, for the rear end of the body 10 and illustrated as comprising the rear wheels of an automotive tractor, generally indicated at 17, for hte front end of the body 10. If a livestock carrier of the invention is embodied in a railroad cattle car, then, of course, in place of the highway wheel structures 16 and the tractor 17, the body 10 would be equipped with suitable railroad trucks located similarly with respect to the body 10.

The carrier body 10 has a main deck, generally indicated at 18, which comprises a depressed central section 19, a front end section 20, and a rear end section 21. The depressed central section 19 of the main deck 18 is lower than the level of the end sections 20 and 21 of the main deck 18 by a distance such that the support wheel structures may be positioned beneath the end decks 20 and 21.

A vertically movable deck 22 is supported in position overlying the central section 19 of the deck 18, being illustrated as suspended by four main cables 23 which pass over suitable pulleys 24 and are wound upon winches 25 at each side of the body 10 (see Figs. 3 and 6). By properly energizing motors which drive the winches 25, the vertically movable deck 22 may be raised and lowered between its lowermost position shown in solid lines in Fig. 2, an upper position shown in dotted lines in Fig. 2 and indicated by the reference number 22a, and an intermediate position also shown in dotted lines in Fig. 2 and indicated by the reference number 22b.

The body 10 is thus divided longitudinally into three areas. The first of these areas, designated in the drawings as "area A", is located above the front end deck section 20 and delineated by the side walls 11 and 12, the front wall 14 and the front end deck section 20. Area A is separated from the central portion of the body 10, which includes two areas, designated in the drawings as "area B" and "area C", by a transverse partition 26. As in the case of the side walls 11 and 12, the partition 26 may also be formed of openwork, and it is thus illustrated, for example, in Fig. 6 of the drawings. The central portion of the body 10, which forms the areas B and C, is co-extensive in plan view with the depressed central deck section 19 and the vertically movable deck 22. Areas B and C are divided from each other by the movable deck 22 when it is in its intermediate position indicated by the reference number 22b. The central portion of the body 10, comprising areas B and C, is divided from a rearmost portion, indicated by the legend "area D", by a transverse partition 27 which, like the partition 26, is illustrated in the drawings as being formed by an open framework. Area D is thus delineated by the rear portions of the side walls 11 and 12, the partition 27, and by openable rear doors 28 on the body 10.

A built-in ramp 29 leads from the rear end section deck portion 21 downwardly to the depressed central deck portion 19. The upper side of the ramp 29 is normally covered by a hinged cover plate 30 which forms a part of the rear end deck section 21. A second ramp 31 is built into the partition 27 and is so designed as to form a portion of the partition 27 when it is in the upper position shown by the solid lines in the drawings. When the ramp 31 is swung downwardly and rearwardly to the dotted line position indicated by the reference number 31a, it leads from the rear end deck section 21 to the intermediate level of the vertically movable deck at the position indicated by the reference number 22b in Fig. 2.

The forward partition 26 has a door 32 (see Fig. 6) and the rearward partition 27 has a door 33 which may be separably open to permit passage of livestock through the partitions 26 and 27, respectively, or the entire partitions 26 and 27 may be swung open to the side of the body 10, as generally indicated by the arcuate arrows in Fig. 3. Either or both of these ways of providing for passage of livestock past the partitions 26 and 27 may be employed.

Livestock is loaded into a livestock carrier embodying the invention in the following manner: The partitions 26 and 27 are swung to the side of the body 10, or their respective doors are opened widely. The vertically movable deck 22 is positioned at its lower position in the plane of the end deck sections 20 and 21, above the level of the depressed central deck section 19. The rear doors 28 on the body 10 are opened. Cattle are driven through area D across the movable deck 22 and into area A in sufficient number to pack area A. The door in the partition 26, or the entire partition itself, is swung shut. The movable deck 22 is raised to the uppermost level indicated at 22a in Fig. 2. The cover 30 for the ramp 29 is swung upwardly and over, opening the ramp 29. Cattle are then driven across area D and downwardly onto the depressed central deck section 19 in sufficient number to load that deck and to fill area C. The ramp cover 30 is swung back into place and the door in partition 27, or the partition itself, is swung across the body 10. The movable deck is lowered to intermediate position, indicated by the reference number 22b, and the ramp 31 is swung downwardly out of the partition 27 to the position indicated by the reference number 31a. The movable deck 22 now divides the central portion of the body 10 into area C at the lower level and area B at the upper level. Cattle are then driven through area D upwardly into area B on the vertically movable deck 22 until area B is filled. The ramp 31 is then swung up to its vertical position and cattle are driven into area D, after which the rear doors 28 are closed.

Thus, according to the invention, by providing the depressed central deck portion 19, in the space between the support wheel mechanism 16 and the support wheels of the tractor 17 (or between the trucks of a railroad car), it is possible to "double deck" the cattle in the major portion of the livestock carrier and yet to provide easy access to both the single level front deck 20 and area A as well as from the loading end of the body 10.

I claim:

1. In a wheeled livestock carrier having an elongated, generally rectilinear body with parallel vertical side walls, the improvement comprising, in combination, a main deck having a depressed central section and front and rear end sections at a level higher than said central section by sufficient distance for the accommodation of support wheel structures beneath said end sections, a vertically movable deck supported in said body above said central section and having a plan configuration substantially identical with said central section, a front wall across the front end of the forward one of said end sections, a partition across said body between each of said end sections and said central section, each of said partitions being openable, elevating mechanism in said body for supporting and vertically moving said movable deck between a lower position at the level of said end deck sections, an upper position near the top of said body and an intermediate position midway between said central deck section and the top of said body, and a ramp adapted to lead from said rear deck section to said movable deck at such intermediate position.

2. A livestock carrier according to claim 1 in which said ramp is hinged in that one of said partitions extending between the rear deck section and the central deck section at the intermediate position of said movable deck and forms a part thereof when in upper closed position.

3. A livestock carrier according to claim 1 and a ramp leading from the rear one of said end sections to said central section.

4. In a wheeled livestock carrier having an elongated, generally rectilinear body with parallel vertical side walls, a roof extending horizontally in a single plane across said body and wheels beneath its front and rear end sections, the improvement comprising, in combination, a front deck extending across said body at said front end section at a level above the front wheels and extending rearwardly to about the rear edge of the front wheels, a rear deck extending across said body at said rear end section at a level above said rearwheels, approximately in the plane of said front deck and extending forwardly to about the front edge of the rear wheels, a fixed center deck extending across said body in a center section thereof between the rear and front edges respectively of said front and rear decks at a level below the level of said front and rear decks and between the wheels, a movable center deck having a horizontal extent substantially the same as said fixed center deck, means in said body for supporting said movable center deck in a first position at the level of said front and rear decks with the space beneath said movable center deck unobstructed and in a second position at a horizontal position above said front and rear decks and centrally disposed between the level of said fixed center deck and the roof of said carrier, movable partitions between said front section and a center section defined by said center decks and between said rear section and said center section and ramp means for leading cattle from said rear section to said fixed center deck and to said movable center deck in second position.

5. A carrier according to claim 4 having a movable center deck structure that is movable vertically between said two positions and means for elevating and lowering said movable center deck to and from said two positions.

6. A carrier according to claim 4 in which said ramp means is hingedly mounted for movement between a first position in which it extends into said rear end section during loading of said center section and a second position clear of said rear end section.

References Cited in the file of this patent
UNITED STATES PATENTS

| | | |
|---|---|---|
| 836,890 | Phillips | Nov. 27, 1906 |
| 1,185,867 | Bennett | June 6, 1916 |
| 1,205,674 | Shelton | Nov. 21, 1916 |
| 1,700,646 | Rommel | Jan. 29, 1929 |
| 2,093,859 | Austin | Sept. 21, 1937 |
| 2,461,927 | Schaldach et al. | Feb. 15, 1949 |
| 2,611,640 | Francis | Sept. 23, 1952 |
| 2,696,402 | McDaniel | Dec. 7, 1954 |